(12) United States Patent
Conger et al.

(10) Patent No.: US 10,604,084 B2
(45) Date of Patent: Mar. 31, 2020

(54) VEHICLE CAMERA WITH MODULAR CONSTRUCTION

(71) Applicant: MAGNA ELECTRONICS INC., Auburn Hills, MI (US)

(72) Inventors: Jonathan D. Conger, Berkley, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/511,092

(22) Filed: Jul. 15, 2019

(65) Prior Publication Data

US 2019/0337467 A1 Nov. 7, 2019

Related U.S. Application Data

(62) Division of application No. 15/341,047, filed on Nov. 2, 2016, now Pat. No. 10,351,072.

(60) Provisional application No. 62/251,242, filed on Nov. 5, 2015.

(51) Int. Cl.
*B60R 11/04* (2006.01)
*H04N 5/00* (2011.01)
*H04N 5/225* (2006.01)

(52) U.S. Cl.
CPC ........... *B60R 11/04* (2013.01); *H04N 5/2252* (2013.01)

(58) Field of Classification Search
CPC .............................. B60R 11/04; H04N 5/2252
USPC ....................................................... 348/148
See application file for complete search history.

(56) References Cited

U.S. PATENT DOCUMENTS

| | | |
|---|---|---|
| 5,204,615 A | 4/1993 | Richards et al. |
| 5,525,264 A | 6/1996 | Cronin et al. |
| 5,550,677 A | 8/1996 | Schofield et al. |
| 5,559,556 A | 9/1996 | Kagebeck |
| 5,657,539 A | 8/1997 | Orikasa et al. |
| 5,670,935 A | 9/1997 | Schofield et al. |
| 5,821,532 A | 10/1998 | Beaman et al. |
| 5,854,708 A | 12/1998 | Komatsu et al. |
| 5,872,332 A | 2/1999 | Verma |
| 5,920,061 A | 7/1999 | Feng |
| 5,949,331 A | 9/1999 | Schofield et al. |
| 5,978,017 A | 11/1999 | Tino |
| 6,002,544 A | 12/1999 | Yatsu |
| 6,013,372 A | 1/2000 | Hayakawa et al. |
| 6,071,606 A | 6/2000 | Yamazaki et al. |

(Continued)

*Primary Examiner* — Jeffrey A Williams
(74) *Attorney, Agent, or Firm* — Honigman LLP

(57) ABSTRACT

A camera assembly for a vision system of a vehicle includes a front housing portion having a lens, a circuit board having an imager and circuitry having an electrical connecting element, and a rear housing portion having a rear attachment portion and a mounting portion configured to attach at a vehicle. When the front housing portion is joined with the rear housing portion, the electrical connecting element of the circuit board is aligned with an aperture of the attachment plate and a connecting end of an electrical connector protrudes through the aperture to electrically connect with the electrical connecting element of the circuit board. A structural element of the electrical connector is attached at the attachment plate of the bracket to seal the aperture and to maintain electrical connection of the connecting end of the electrical connector with the electrical connecting element of the circuit board.

20 Claims, 11 Drawing Sheets

(56) References Cited

U.S. PATENT DOCUMENTS

| | | |
|---|---|---|
| 6,072,814 A | 6/2000 | Ryan et al. |
| 6,117,193 A | 9/2000 | Glenn |
| 6,151,065 A | 11/2000 | Steed |
| 6,178,034 B1 | 1/2001 | Allemand et al. |
| 6,193,378 B1 | 2/2001 | Tonar et al. |
| 6,222,447 B1 | 4/2001 | Schofield et al. |
| 6,259,475 B1 | 7/2001 | Ramachandran et al. |
| 6,292,311 B1 | 9/2001 | Bohn et al. |
| 6,481,003 B1 | 11/2002 | Maeda |
| 6,483,101 B1 | 11/2002 | Webster |
| 6,535,242 B1 | 3/2003 | Strumolo et al. |
| 6,559,439 B1 | 5/2003 | Tsuchida et al. |
| 6,590,658 B2 | 7/2003 | Case et al. |
| 6,603,612 B2 | 8/2003 | Nakano |
| 6,651,187 B2 | 11/2003 | Lacey, III |
| 6,654,187 B2 | 11/2003 | Ning |
| 6,805,767 B2 | 10/2004 | Shinomiya |
| 6,897,432 B2 | 5/2005 | Schmidtke et al. |
| 7,015,944 B2 | 3/2006 | Holz et al. |
| 7,031,075 B2 | 4/2006 | Tsuji |
| 7,095,123 B2 | 8/2006 | Prior |
| 7,095,572 B2 | 8/2006 | Lee et al. |
| 7,215,479 B1 | 5/2007 | Bakin |
| 7,268,957 B2 | 9/2007 | Frenzel et al. |
| 7,289,037 B2 | 10/2007 | Uken et al. |
| 7,391,458 B2 | 6/2008 | Sakamoto |
| 7,419,315 B2 | 9/2008 | Hirata et al. |
| 7,423,665 B2 | 9/2008 | Ray et al. |
| 7,453,509 B2 | 11/2008 | Losehand et al. |
| 7,480,149 B2 | 1/2009 | DeWard et al. |
| 7,536,316 B2 | 5/2009 | Ozer et al. |
| 7,599,134 B2 | 10/2009 | Bechtel et al. |
| 7,665,915 B2 | 2/2010 | Lee |
| 7,697,056 B2 | 4/2010 | Huang |
| 7,768,574 B2 | 8/2010 | Humpston |
| 7,965,336 B2 | 6/2011 | Bingle et al. |
| 8,120,652 B2 | 2/2012 | Bechtel et al. |
| 8,256,821 B2 | 9/2012 | Lawlor et al. |
| 8,318,512 B2 | 11/2012 | Shah et al. |
| 8,482,664 B2 | 7/2013 | Byrne et al. |
| 8,542,451 B2 | 9/2013 | Lu et al. |
| 8,570,374 B2 | 10/2013 | Betham et al. |
| 8,866,907 B2 | 10/2014 | McElroy et al. |
| 8,994,878 B2 | 3/2015 | Byrne et al. |
| 9,210,307 B2 | 12/2015 | Gebauer et al. |
| 9,233,641 B2 | 1/2016 | Sesti et al. |
| 9,277,104 B2 | 3/2016 | Sesti et al. |
| 9,338,334 B2 | 5/2016 | Lu et al. |
| 9,365,160 B2 | 6/2016 | Byrne et al. |
| 9,451,138 B2 | 9/2016 | Winden et al. |
| 9,487,159 B2 | 11/2016 | Achenbach |
| 9,565,342 B2 | 2/2017 | Sauer et al. |
| 9,596,387 B2 | 3/2017 | Achenbach et al. |
| 9,621,769 B2 | 4/2017 | Mai et al. |
| 9,986,136 B2 | 5/2018 | Newiger |
| 9,992,392 B2 | 6/2018 | Byrne et al. |
| 10,351,072 B2 | 7/2019 | Conger et al. |
| 2002/0167605 A1 | 11/2002 | Akimoto et al. |
| 2002/0175832 A1 | 11/2002 | Mizusawa |
| 2003/0090569 A1 | 5/2003 | Poechmueller |
| 2003/0137595 A1 | 7/2003 | Takachi |
| 2005/0104995 A1 | 5/2005 | Spryshak et al. |
| 2005/0141106 A1 | 6/2005 | Lee et al. |
| 2005/0190283 A1 | 9/2005 | Ish-Shalom et al. |
| 2005/0274883 A1 | 12/2005 | Nagano |
| 2006/0049533 A1 | 3/2006 | Kamoshita |
| 2006/0050018 A1 | 3/2006 | Hutzel et al. |
| 2006/0054802 A1 | 3/2006 | Johnston |
| 2006/0056077 A1 | 3/2006 | Johnston |
| 2006/0061008 A1 | 3/2006 | Karner et al. |
| 2006/0065436 A1 | 3/2006 | Gally et al. |
| 2006/0077575 A1 | 4/2006 | Nakai et al. |
| 2006/0103727 A1 | 5/2006 | Tseng |
| 2006/0125919 A1 | 6/2006 | Camilleri et al. |
| 2006/0171704 A1* | 8/2006 | Bingle .................... B60R 11/04 396/419 |
| 2006/0184297 A1 | 8/2006 | Higgins-Luthman |
| 2007/0040034 A1 | 2/2007 | Hennick |
| 2007/0096020 A1 | 5/2007 | Mitsugi et al. |
| 2007/0279518 A1 | 12/2007 | Apel et al. |
| 2008/0024883 A1 | 1/2008 | Iwasaki |
| 2008/0043105 A1 | 2/2008 | Kallhammer et al. |
| 2008/0122965 A1 | 5/2008 | Fang |
| 2009/0010494 A1 | 1/2009 | Bechtel et al. |
| 2009/0012203 A1 | 1/2009 | Nakanishi et al. |
| 2009/0122141 A1 | 5/2009 | Nakamura et al. |
| 2009/0244361 A1 | 10/2009 | Gebauer et al. |
| 2009/0295181 A1 | 12/2009 | Lawlor et al. |
| 2010/0015713 A1 | 1/2010 | Deeter et al. |
| 2010/0097519 A1* | 4/2010 | Byrne ...................... B60R 1/00 348/373 |
| 2010/0103308 A1 | 4/2010 | Butterfield et al. |
| 2010/0279439 A1 | 11/2010 | Shah et al. |
| 2011/0025850 A1 | 2/2011 | Maekawa et al. |
| 2011/0298968 A1 | 12/2011 | Tseng et al. |
| 2012/0081550 A1 | 4/2012 | Sewell |
| 2012/0265416 A1 | 10/2012 | Lu et al. |
| 2013/0242099 A1 | 9/2013 | Sauer et al. |
| 2014/0000804 A1 | 1/2014 | Looi et al. |
| 2014/0022657 A1 | 1/2014 | Lu et al. |
| 2014/0313337 A1 | 10/2014 | Devota et al. |
| 2014/0373345 A1 | 12/2014 | Steigerwald |
| 2015/0124098 A1 | 5/2015 | Winden et al. |
| 2015/0222795 A1 | 8/2015 | Sauer et al. |
| 2015/0266430 A1 | 9/2015 | Mleczko et al. |
| 2015/0327398 A1 | 11/2015 | Achenbach et al. |
| 2015/0365569 A1 | 12/2015 | Mai et al. |
| 2016/0037028 A1 | 2/2016 | Biemer |
| 2016/0255257 A1 | 9/2016 | Lu et al. |
| 2016/0268716 A1 | 9/2016 | Conger et al. |
| 2017/0054881 A1 | 2/2017 | Conger et al. |
| 2017/0129419 A1 | 5/2017 | Conger et al. |
| 2017/0133811 A1 | 5/2017 | Conger et al. |
| 2017/0201661 A1 | 7/2017 | Conger |
| 2017/0295306 A1 | 10/2017 | Mleczko |
| 2017/0302829 A1 | 10/2017 | Mleczko et al. |
| 2018/0072239 A1 | 3/2018 | Wienecke et al. |
| 2018/0098033 A1 | 4/2018 | Mleczko et al. |

* cited by examiner

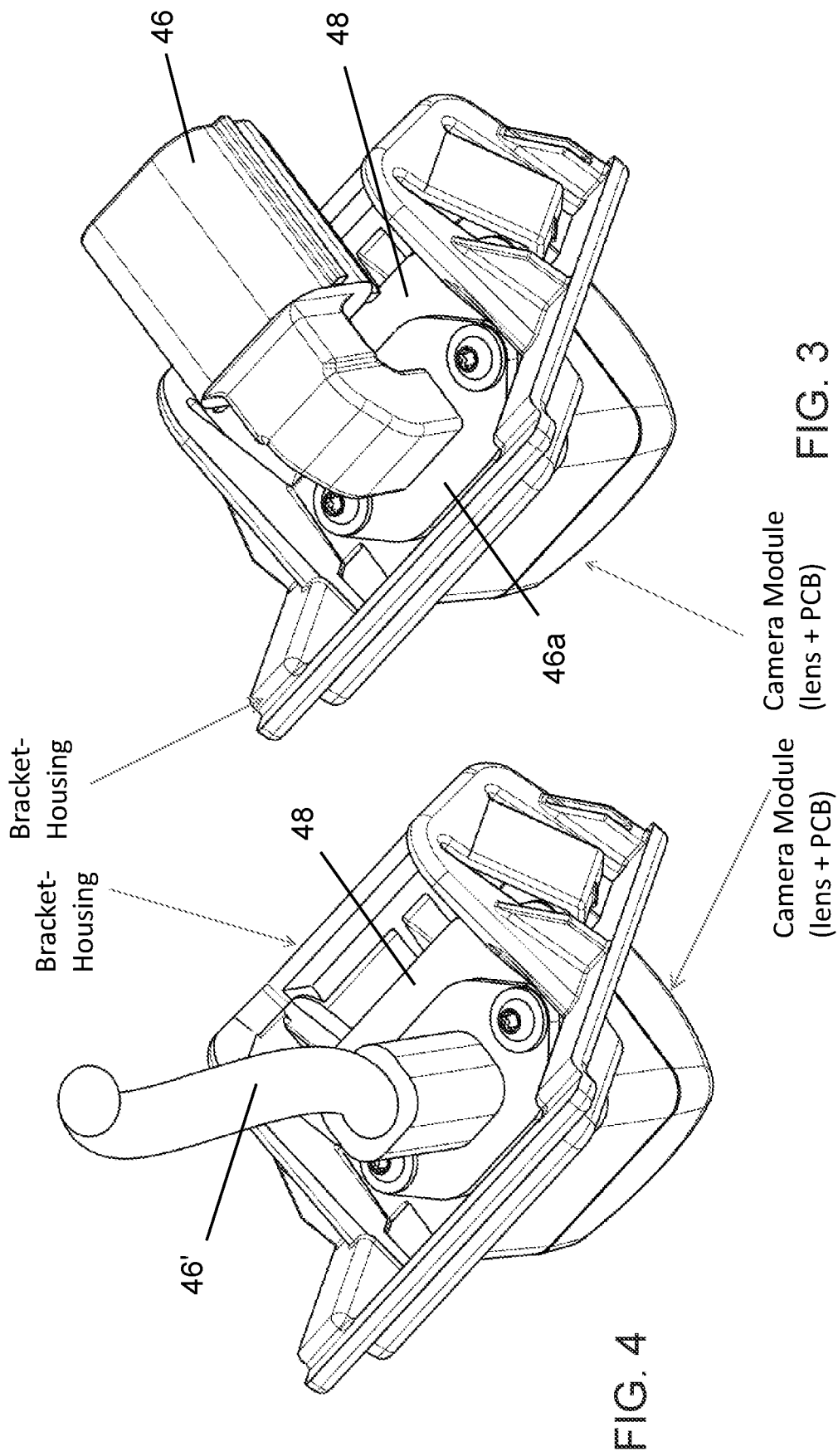

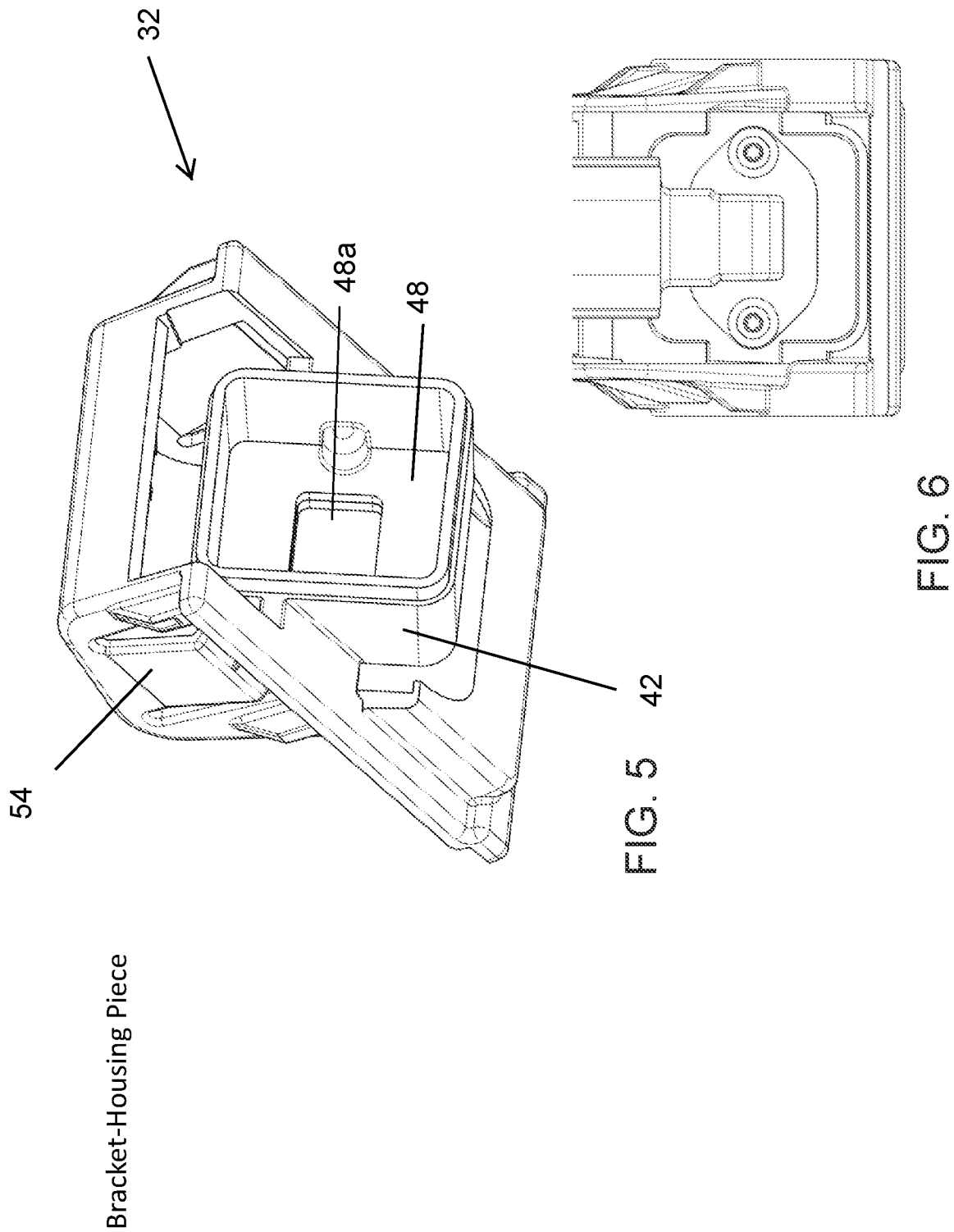

VEHICLE CAMERA WITH MODULAR CONSTRUCTION

CROSS REFERENCE TO RELATED APPLICATIONS

The present application is a division of U.S. patent application Ser. No. 15/341,047, filed Nov. 2, 2016, now U.S. Pat. No. 10,351,072, which claims the filing benefits of U.S. provisional application Ser. No. 62/251,242 filed Nov. 5, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras are known, such as described in U.S. Pat. Nos. 7,965,336 and//or 8,542,451, which are hereby incorporated herein by reference in their entireties.

SUMMARY OF THE INVENTION

The present invention provides a camera assembly configured for mounting at a vehicle. The camera assembly comprises a camera module or unit (having a lens assembly, imager and circuit element or circuit board and associated circuitry) and a bracket for receiving or attaching to the camera unit and for mounting the camera at the vehicle. An electrical connector is received at a rear portion of the bracket and electrically connects with the circuitry of the circuit element for electrically connecting the circuitry to a wiring harness of a vehicle or the like.

According to an aspect of the present invention, a camera assembly for a vision system of a vehicle includes a camera, a bracket and an electrical connector. The camera includes a lens assembly, an imager disposed on a circuit element, and an outer camera housing portion. The circuit element has a connector disposed at a surface thereof generally opposite the imager. The bracket comprises an outer bracket housing portion, an attachment plate and a mounting portion. The mounting portion is configured to attach at a vehicle. The electrical connector has a connector plate and a connecting end at the connector plate. The outer camera housing portion mates with the outer bracket housing portion and, when so mated or attached, the connector of the circuit element is generally aligned with an aperture of the attachment plate and the connecting end of the electrical connector protrudes through the aperture to electrically connect with the connector of the circuit element. The connector plate is attached at the attachment plate of the bracket to seal the connector at the bracket.

Thus, the present invention provides a modular camera design that allows for easy adaptation into multiple applications, and reduced part count in the assembly. Automotive cameras require a method of absorbing the tolerances associated with alignment of the image sensor relative to the lens. Typically, this is done by allowing the housing to vary in position relative to the lens or by implementing flexible printed circuits, both of which increase the size of the camera. The present invention provides a method of absorbing these tolerances using a new connector-plate concept, which provides a much smaller size and the least impact to the packaging of the camera in the vehicle. In addition, the camera housing is integrated as part of the camera bracket to reduce the part count, cost, and complexity of the assembly. Various bracket-housings and connector-plates can then be interchanged to adapt the camera to multiple applications. The modular connector-plate concept also allows for ultrasonic welding, a preferred joining method. Ultrasonic welding requires large flat surface areas, which are achieved by assembling the connector plate to the bracket-housing after welding. Finally, a novel harness design is provided as one of the potential connector plate options.

These and other objects, advantages, purposes and features of the present invention will become apparent upon review of the following specification in conjunction with the drawings.

BRIEF DESCRIPTION OF THE DRAWINGS

FIG. 3 is another perspective view of the camera assembly of FIG. 2;

FIG. 4 is a perspective view of another camera assembly having a wire harness connected thereto;

FIG. 5 is a perspective view of the mounting bracket of the present invention, without the imager and lens and camera housing disposed thereat;

FIG. 6 is a rear plan view of the mounting bracket of FIG. 5;

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
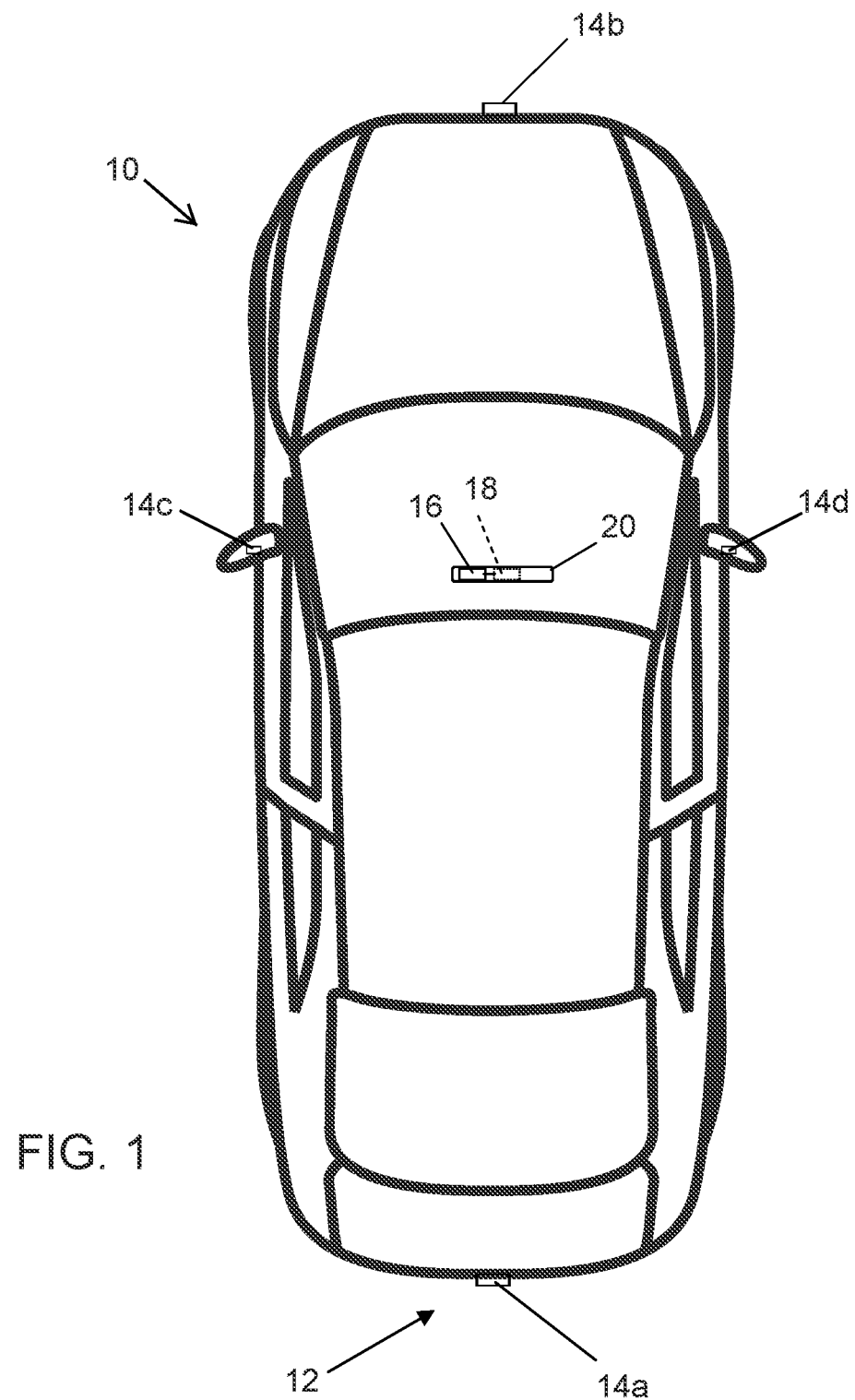
FIG. 1 is a plan view of a vehicle with a vision system that incorporates cameras in accordance with the present invention.
Figure 2:
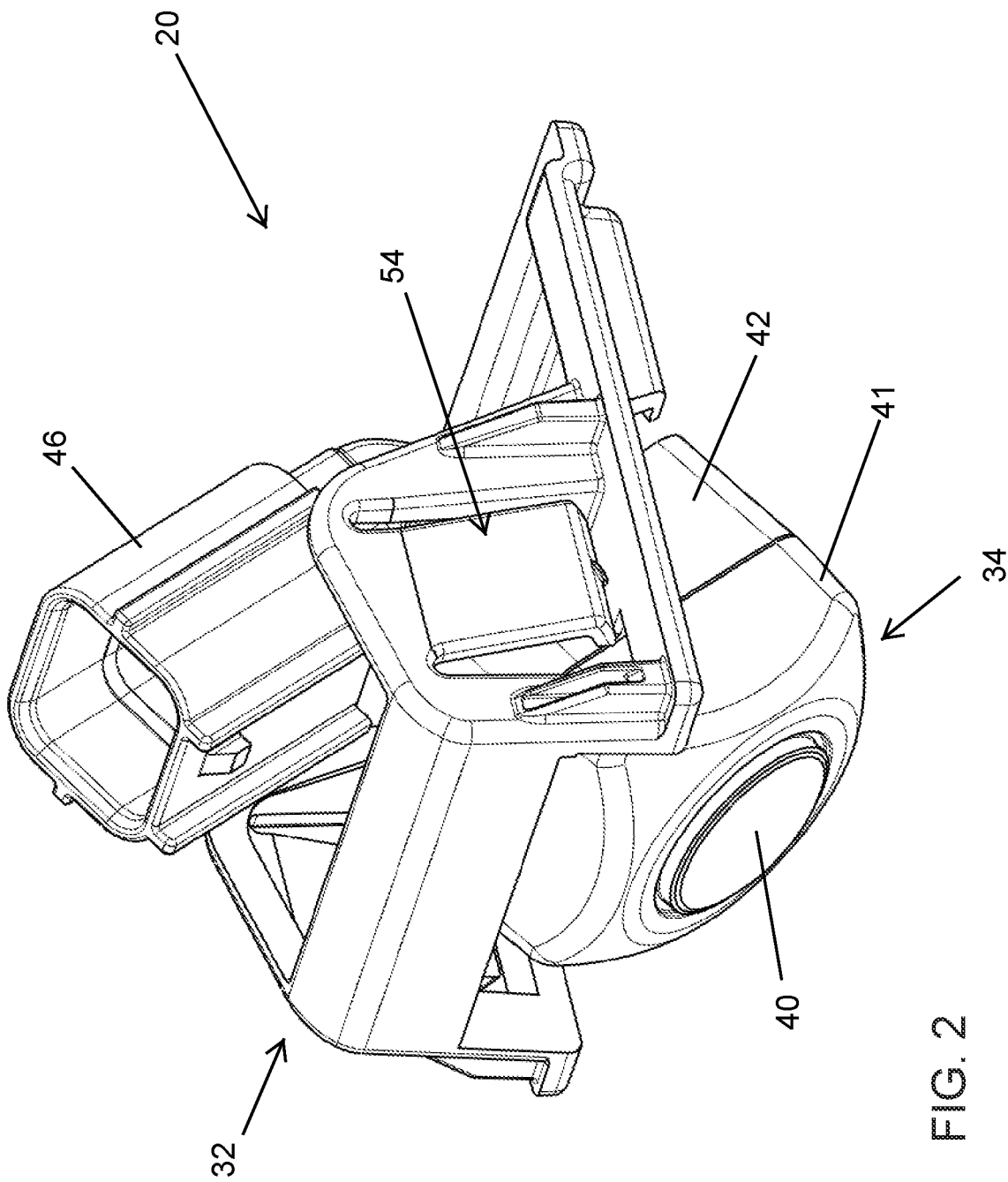
FIG. 2 is a perspective view of a camera assembly having a modular mounting bracket in accordance with the present invention.
Figure 7:
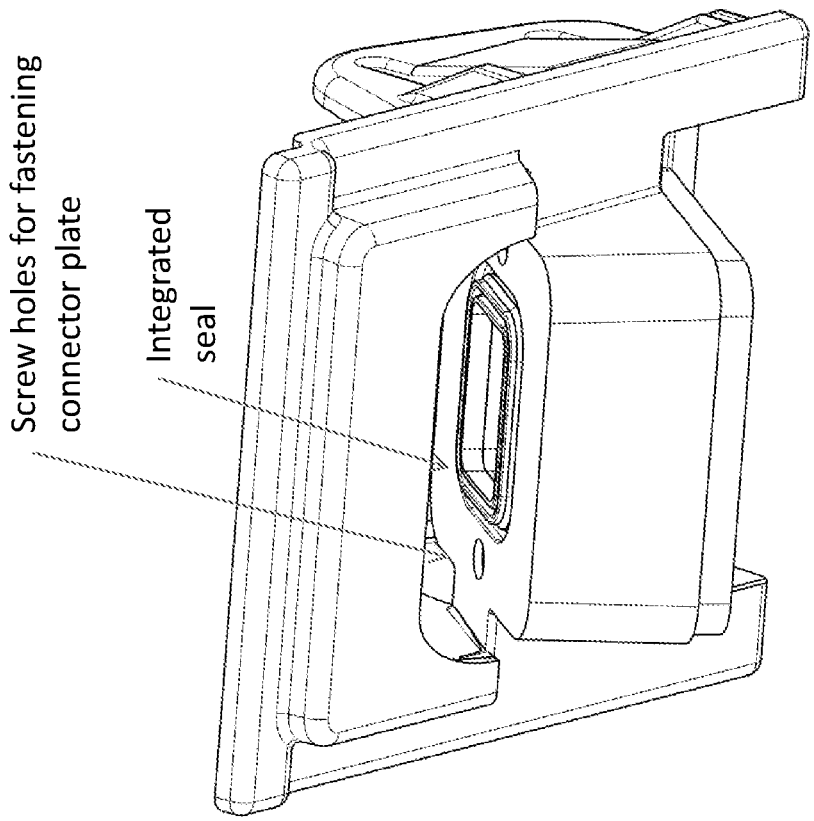
FIG. 7 is another perspective view of the mounting bracket of FIG. 5.
Figure 8:
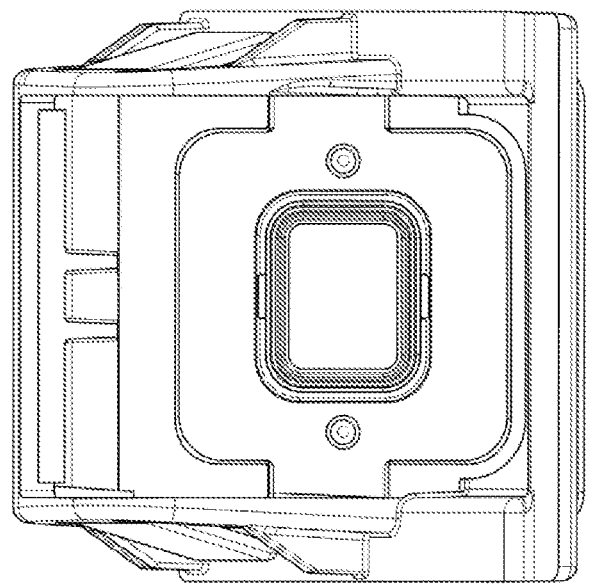
FIG. 8 is another rear plan view of the mounting bracket of FIG. 5, shown without the electrical connector.
Figure 9:
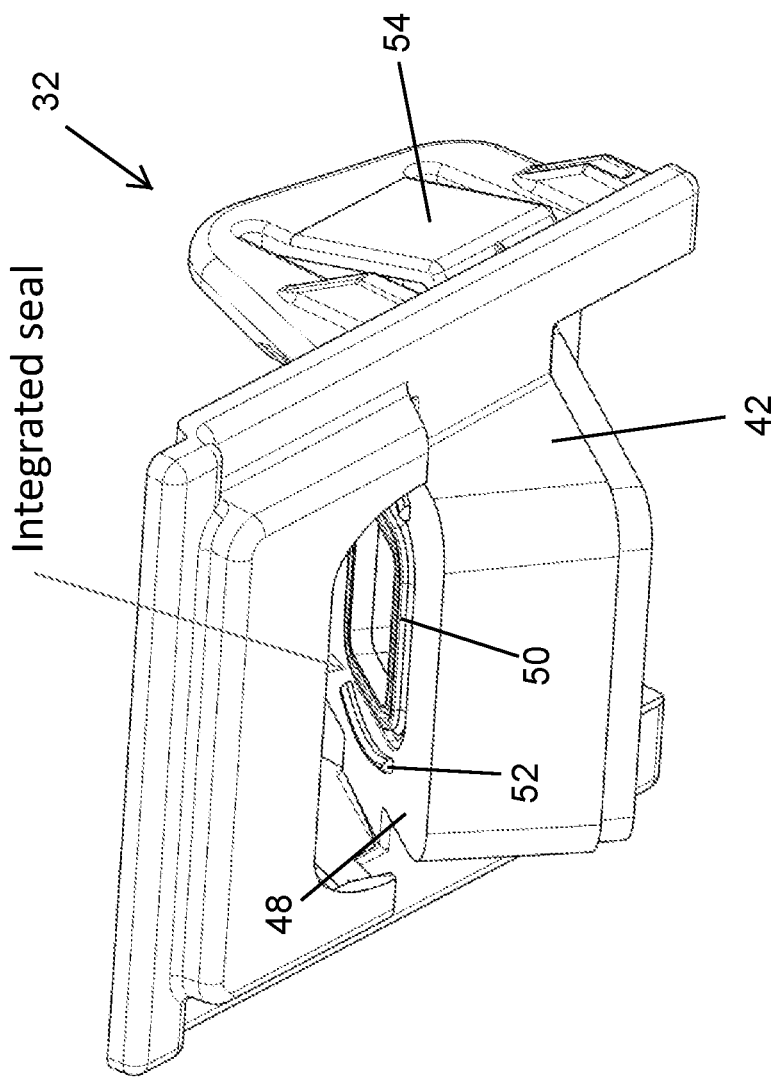
FIG. 9 is a perspective view of another mounting bracket of the present invention, showing optional weld ribs to facilitate fastening of the connector plate of the electrical connector.
Figure 11:
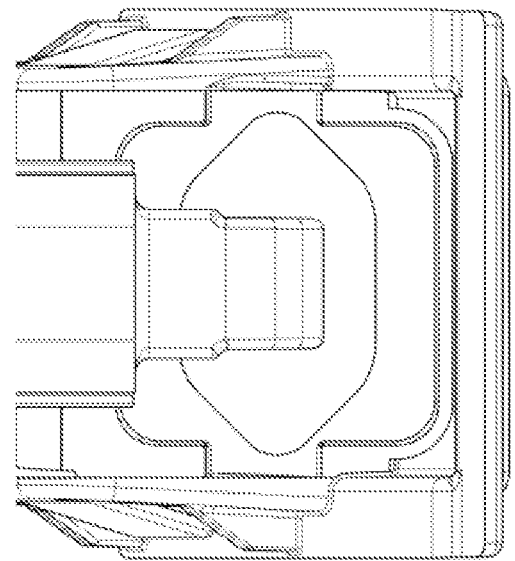
FIG. 11 is another rear plan view of the mounting bracket of FIG. 9, showing the connector plate disposed at the seal and weld ribs.
Figure 12:
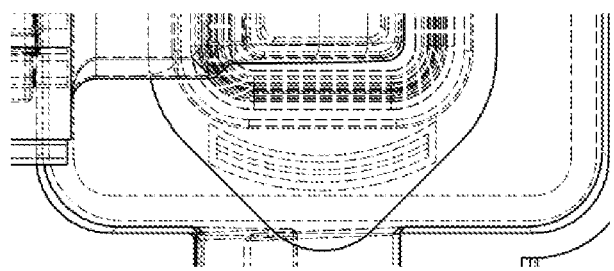
FIG. 12 is a partial rear plan view of the mounting bracket and connector of FIG. 11.
Figure 10:
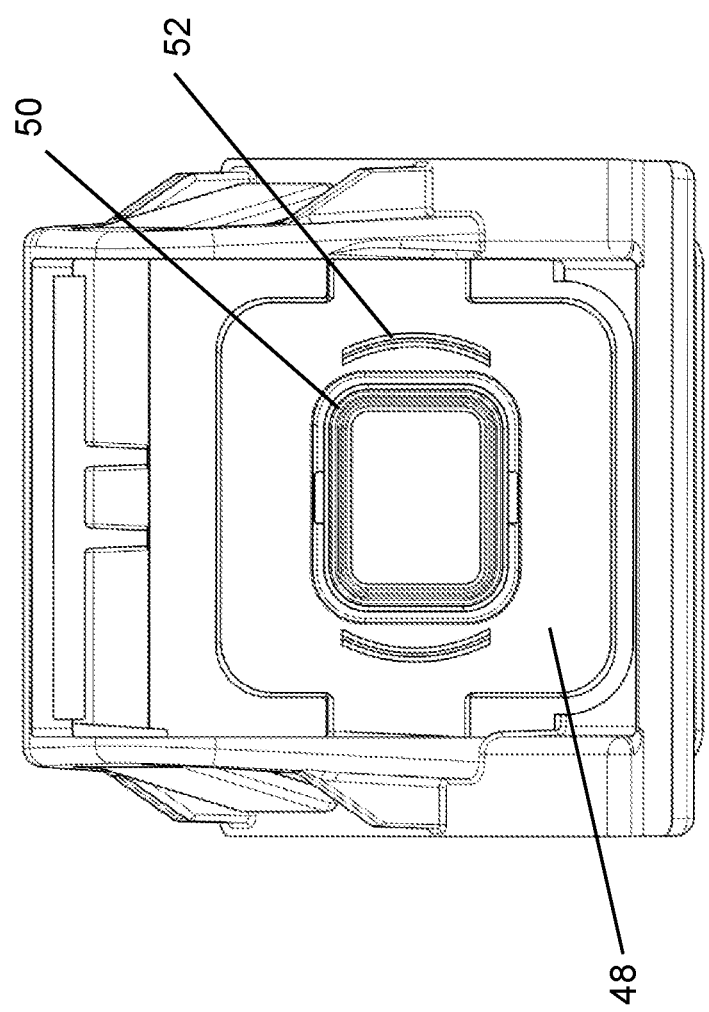
FIG. 10 is a rear plan view of the mounting bracket of FIG. 9.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera assembly of the present invention comprises a mounting bracket and a camera portion and housing that reduces the total part count and provides a more flexible method for assembly. In this construction, the housing and bracket are one item which provides the advantages of reduced cost, reduced processes in assembly, and more accurate positioning of the imager relative to the mounting features in the vehicle. In addition, it is known that from camera to camera that the PCB will vary in position to optimize the focus and alignment of the image. Typical methods to absorb this tolerance have been a flexible printed circuit, a floating housing, or spring contacts or the like. The flexible printed circuit and spring contacts can be expensive, complicated, and may raise issues with electromagnetic interference. The floating housing method causes one half of the camera to purposely be offset in position relative to the other, raising cosmetic concerns and mounting issues for some vehicle manufacturers.

The construction of the present invention provides a unique method to absorb this tolerance using a connector plate external to the camera module. The variation in position of the connector plate would not affect the mounting, cosmetics, or imager position. In addition, this construction is very cost efficient because the connector engages directly with the printed circuit board using a common surface mount header. The construction of the present invention offers a modular structure where a common lens and PCB assembly could accept a variety of bracket-housings and connector plates to build unique applications for each vehicle manufacturer.

Figure 13:
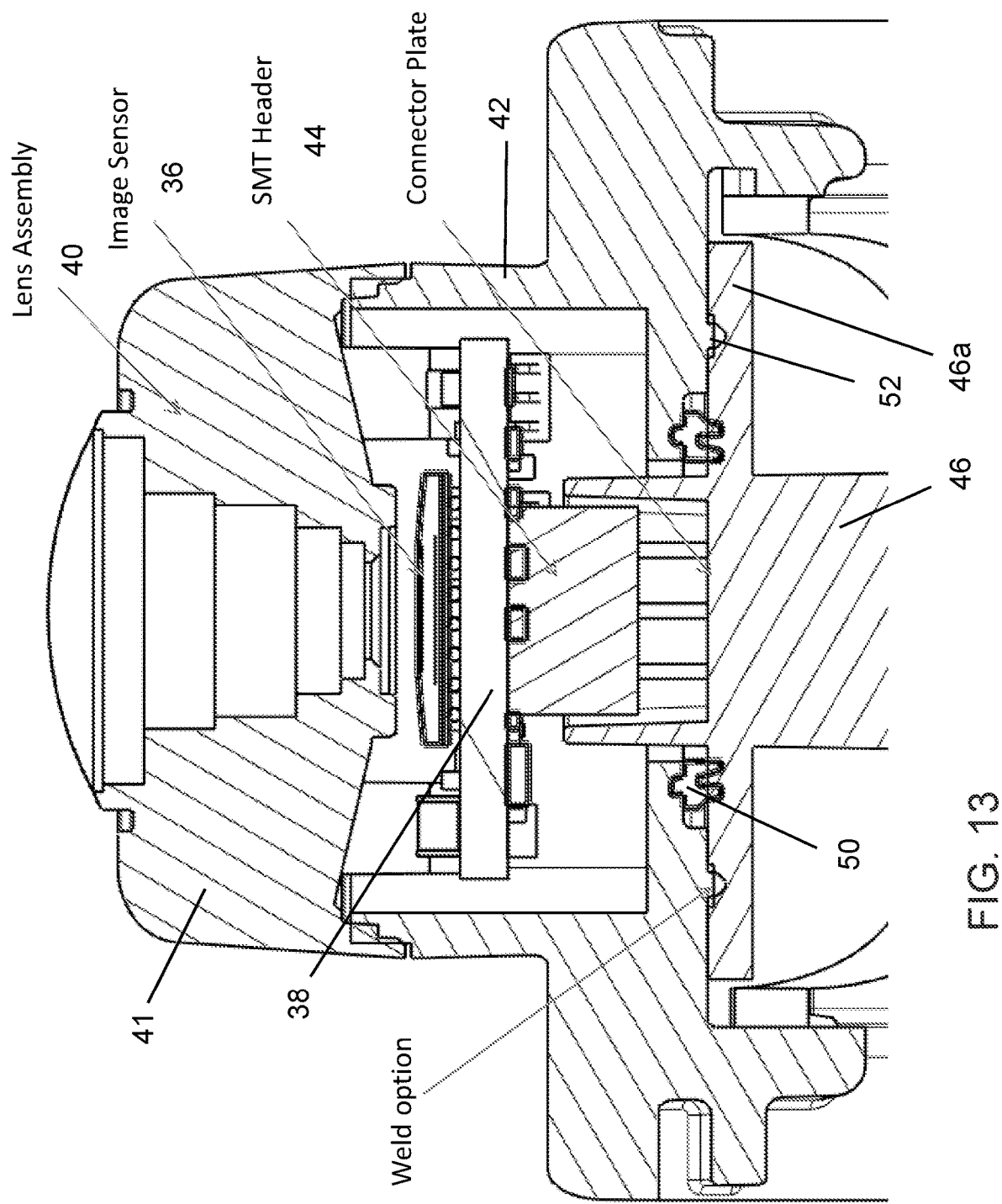
FIG. 13 is a sectional view of the camera assembly of the present invention, shown with the camera attached at the mounting bracket via welding.
Figure 14:
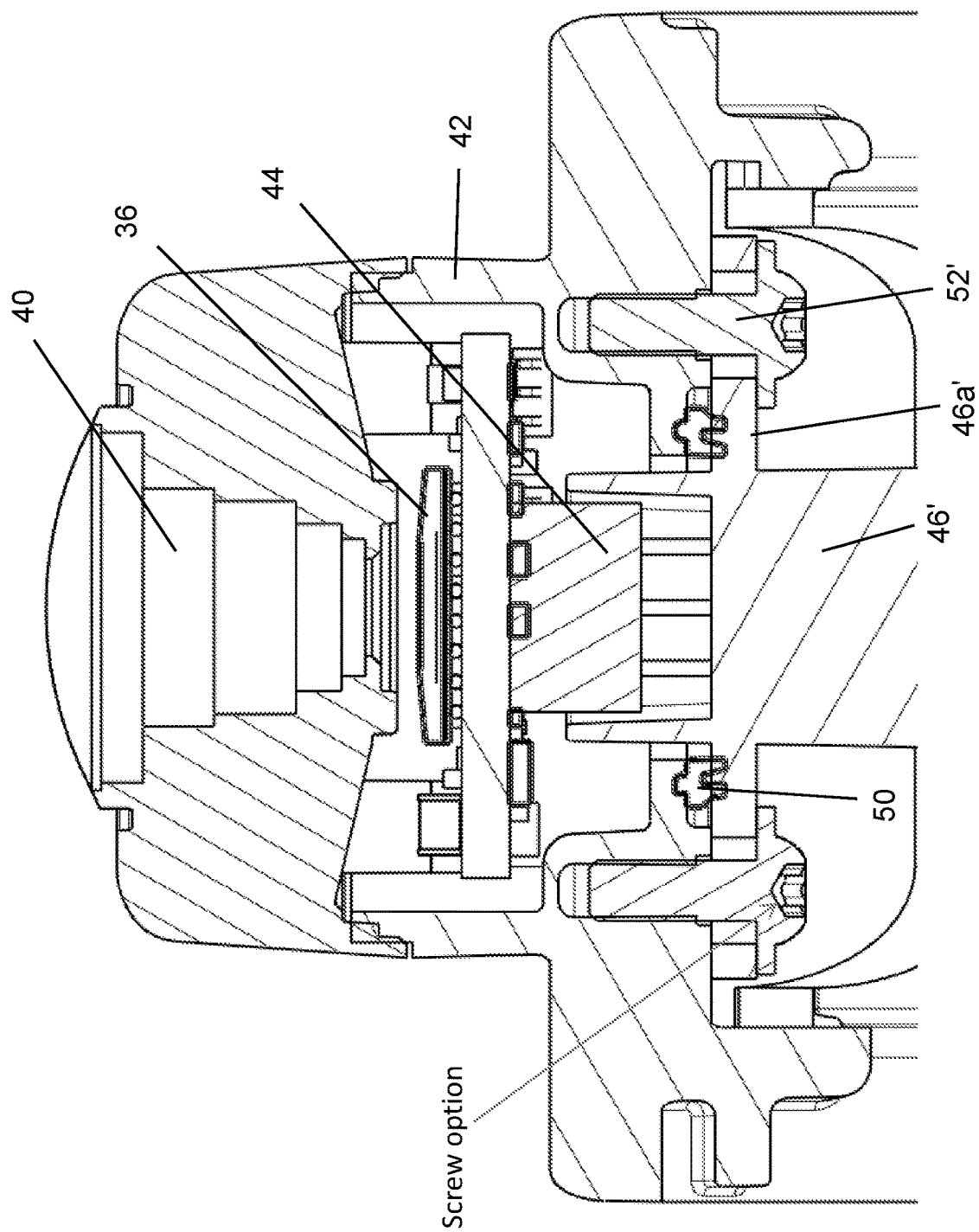
FIG. 14 is a sectional view of another camera assembly of the present invention, shown with the camera attached at the mounting bracket via fasteners.

For example, and such as shown in FIGS. 2, 3 and 5-8, a camera assembly 30 includes a mounting bracket 32 and a camera 34. The camera includes an imager 36 disposed at a circuit element or printed circuit board (PCB) 38 and includes a lens assembly 40 aligned with the imager 36 (see FIGS. 13 and 14). As shown in FIGS. 13 and 14, the camera 34 has an outer or front camera housing portion 41 that accommodates the lens assembly and that is configured to mate with or attach to the bracket housing portion or rear housing portion 42 of the bracket 32. The PCB 38 includes a connector or connecting circuitry or connecting element 44 (such as a SMT header or other connecting element or circuitry) at the side of the PCB opposite the imager. When the front camera housing portion 41 is mated with the rear housing portion 42, the connecting circuitry or element is generally aligned with an aperture 48a through the attachment plate 48 of the rear camera housing portion 42.

The connector 44 of the PCB 38 electrically connects to terminals of a connecting end of a connector 46, with the connecting end disposed at or protruding through the aperture of the attachment plate, and with the connector 46 including a connecting plate 46a that is attached at the attachment plate or portion 48 of the mounting bracket 32, whereby the camera 34 is sealed at the bracket 32. The connector 46 may comprise any suitable connecting end (depending on the application) and the connector plate 46a is configured for attaching at the attachment plate 48 of the bracket. For example, the electrical connector 46 may comprise a 90 degree connector or may comprise a wire harness 46' (FIG. 4), depending on the particular application of the camera assembly. The connector plate is ready for direct connection with a vehicle harness, such as via the 90 degree connector, or may exit at any angle and have any known connector configuration or geometry. The camera construction allows for various bracket-housings and connector plates to be interchanged for different camera applications. Optionally, the electrical connector may comprise an overmolded connector element with the connector plate molded at the connecting end of the connector, such as by utilizing aspects of the connectors described in U.S. patent application Ser. No. 15/341,048, filed on Nov. 2, 2016 by Conger et al., now U.S. Pat. No. 10,250,004, which is hereby incorporated herein by reference in its entirety.

In the illustrated embodiment, the attachment plate 48 of the bracket 32 has an opening or aperture therethrough for receiving the connecting end or portion of the electrical connector 46 in order to make electrical connection to the connector or SMT header 44 of the PCB 38 when the camera is attached at the bracket and/or when the electrical connector 46 is attached at the bracket. The rear surface of the attachment plate 48 includes a sealing element 50 that seals against the connector plate or portion 46a of the electrical connector when the electrical connector is attached at the bracket. The aperture of the attachment plate may be slightly oversized relative to the connecting end of the connector (in other words, a cross dimension of the aperture may be slightly greater than a corresponding cross dimension of the connecting end of the connector that is received in the aperture), such that the electrical connector 46 (and its connecting end) may be laterally adjusted relative to the attachment plate 48 and the connecting circuitry 44 to align the connecting end of the connector 46 with the connecting circuitry 44, without need for other tolerance compensating connectors or flexible circuits. When the connecting end of the connector 46 is aligned with the connecting circuitry 44, the connector may be pressed towards the camera housing to electrically connect the connecting end of the connector 46 with the connecting circuitry 44 and to engage the connector plate 46a with the attachment plate 48, whereby the connector plate 46a may be secured relative to the attachment plate 48, such as via welding or fasteners or the like.

Optionally, and such as shown in FIGS. 9, 10, 12 and 13, the attachment plate 48 of the bracket may also include weld ribs 52 to facilitate fastening of the connector plate 46a of the electrical connector 46 at the bracket. The welding may be via ultrasonic welding, laser welding, hot plate welding, friction welding, vibration welding, hot riveting, heat staking or the like. Optionally, and such as shown in FIG. 14, the connector plate 46a' of the electrical connector 46 may be attached at the attachment plate 48' of the bracket 32' via one or more fasteners 52' (if fasteners are used, the holes through the connector plate 46a for the fasteners may be slightly oversized to allow for lateral adjustment of the connector relative to the threaded fastener holes (see FIGS. 7 and 8) at the attachment plate).

Figure 15:
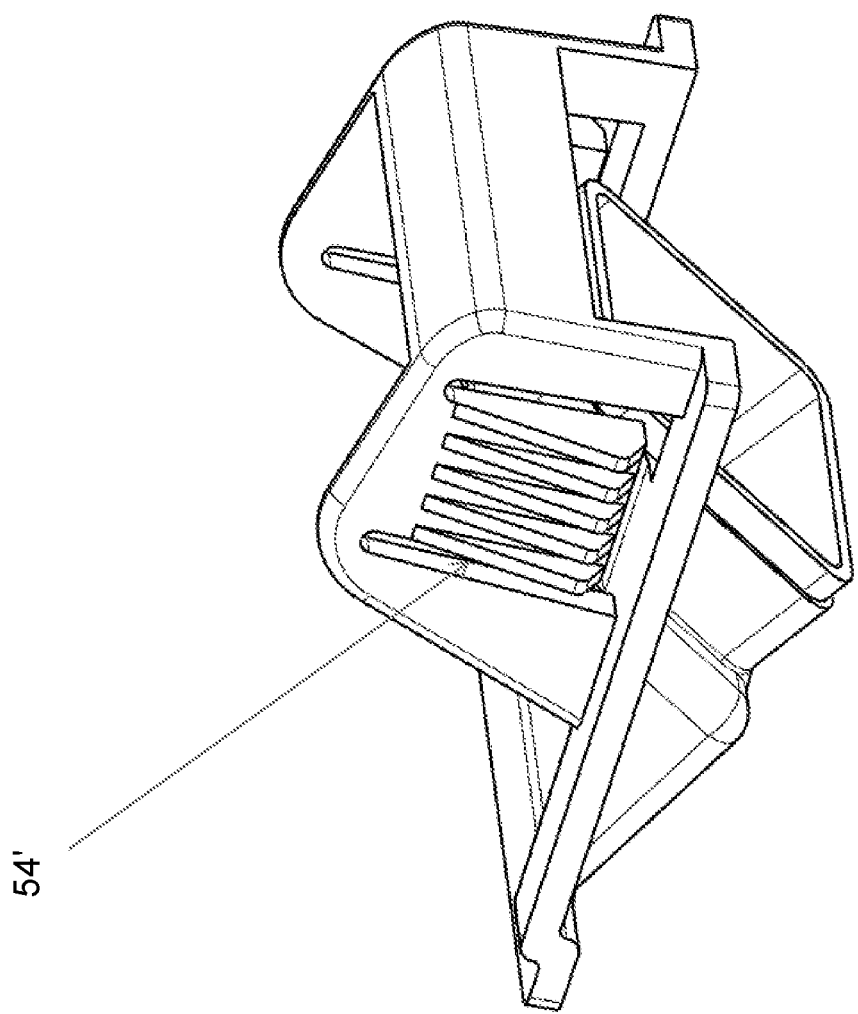
FIG. 15 is a perspective view of another bracket for a camera assembly of the present invention, showing a latch feature for attaching the bracket at a vehicle.
Figure 17:
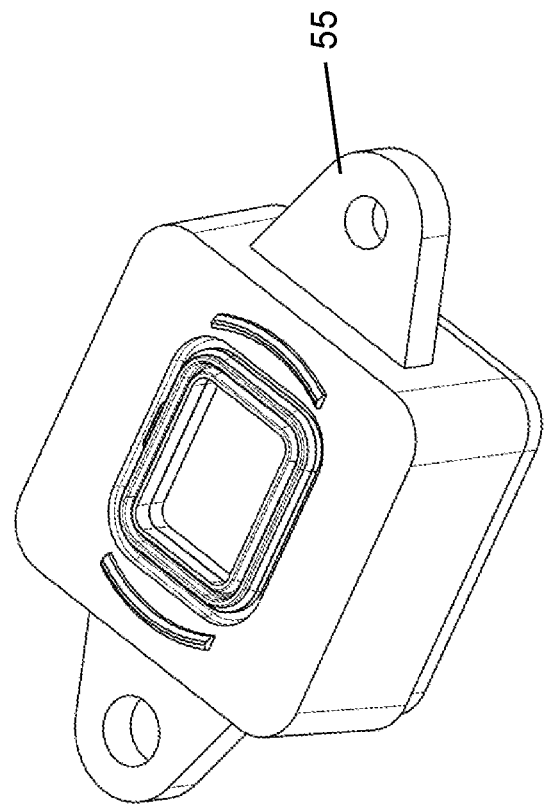
FIG. 17 is a perspective view of the bracket of the camera assembly of FIG. 16.
Figure 16:
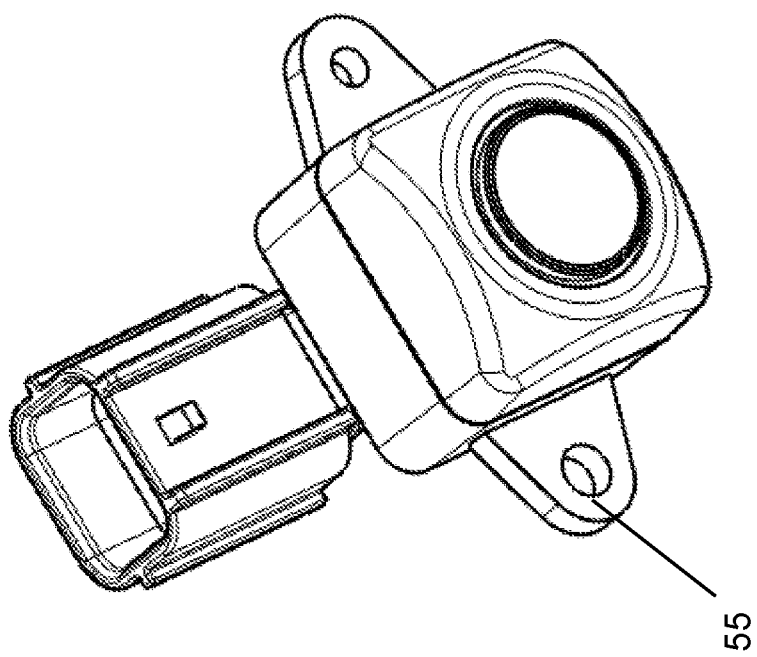
FIG. 16 is a perspective view of another camera assembly of the present invention, showing mounting flanges for attaching the bracket to a vehicle via fasteners.

The bracket 32 thus provides a support structure for the camera 34 and for an electrical connector 46, while providing a desired mounting structure or element 54 for mounting or attaching the camera assembly 30 at a vehicle. For example, the mounting element 54 may comprise a snap-in type construction (or a screw-in or fastener type of bracket construction may also or otherwise be implemented). Optionally, and such as shown in FIG. 15, the mounting structure or element 54' may comprise latch features to facilitate a simple injection mold shape. Optionally, the bracket may be configured with mounting flanges 55 (FIGS. 16 and 17) for attachment at a vehicle with fasteners or screws or the like.

Thus, the camera assembly for a vision system of a vehicle includes a camera and a bracket and an electrical connector. The camera or camera module 34 comprises the lens assembly 40 and has the imager 36 disposed on the circuit element or PCB 18, with the outer camera housing portion 41 supporting the lens assembly 40. The circuit element 38 includes the connector (such as an SMT header or the like) 54 disposed at a surface thereof generally opposite the imager 36. The bracket 32 comprises the outer bracket housing portion 42, the attachment plate 48 (having an aperture therethrough for making electrical connection to the connector of the circuit element or PCB) and the mounting portion 54, with the mounting portion configured to attach at a vehicle.

The PCB 38 and imager 36 and lens assembly 40 may be part of a camera module or unit, and may be received at the outer bracket housing portion 42. A connecting end of the electrical connector 46 is at the connector plate 46a and protrudes through the aperture of the attachment plate for electrically connecting to the connector 44 at the PCB 38. Thus, when the outer camera housing portion is mated with the outer bracket housing portion, the connector of the circuit element is generally aligned with the aperture of the attachment plate and the connecting end of the electrical connector (which may be laterally adjusted relative to the connector of the circuit element and the attachment plate to align its connecting end with the connector of the circuit element) protrudes through the aperture to electrically connect with the connector of the circuit element.

The connector plate is attached at the attachment plate of the bracket, such as after alignment and electrical connection is made between the connecting end of the electrical connector and the connector of the circuit element. The connector plate may be attached at the attachment plate via welding or fasteners, and a sealing element may be disposed around the aperture to seal against the attachment plate and the connector plate when the connector plate is attached at the attachment plate. The mounting portion of the bracket may be configured to attach at a vehicle via a snap attachment or via at least one fastener or the like, depending on the particular application of the camera assembly of the present invention.

Thus, a mounting bracket or bracket-housing piece 32 of the present invention may be designed for a particular vehicle or application (so as to attach to the vehicle and provide a desired viewing angle of the camera when the bracket and camera are attached at the vehicle) and may allow for selection of a particular or desired camera (having a particular imager and lens assembly for a particular application) that may be readily attached at the bracket. Optionally, the camera (having the imager and lens assembly) may comprise a common or universal camera and may be readily attached at a particular bracket for a particular application or vehicle, thereby providing ease of manufacturing of the camera assembly and adapting of the camera assembly for a particular vehicle application. The electrical connection to the SMT header of the PCB of the camera is done via the connector end of the electrical connector that attaches at the rear of the bracket, and thus tolerances can be accommodated for during the connection of the electrical connector, without costly additional tolerance compensating connectors or the like. The connector plate of the connector may be movably or adjustably positioned at the rear of the attachment plate to electrically connect to the connector or SMT header of the PCB of the camera, and then may be welded or otherwise attached at the rear of the bracket attachment plate, thereby sealing the connector at the rear of the bracket. Thus, the camera has a separate connector piece that follows the circuit board and that is plugged into the housing and the connecting circuitry and then staked or welded or fastened to the bracket and/or housing. The lens housing of the camera may also be sealed at the outer end of the outer housing 42 of the bracket to seal the camera at the bracket so as to provide a watertight camera and bracket assembly or module for attachment at a vehicle.

Therefore, the camera assembly and assembly process of the present invention provides for adaptation of a universal or common camera for a particular vehicle application. The front housing portion is provided with the lens and the circuit board and imager may be attached to the front housing portion with the imager optically centered and aligned with the lens. The rear housing portion is mated or joined with the front housing portion, with the rear housing portion being selected to have the desired or appropriate or selected mounting structure for mounting the camera at the vehicle. The electrical connector is selected (such as a socket connection or wire or cable connection) for the particular electrical connection at that vehicle. The electrical connector is disposed at the rear attachment portion of the camera housing and the connecting end of the connector is inserted or received in the aperture of the rear attachment portion and aligned with (such as via lateral adjustment of the connecting end relative to the aperture and connecting element) and electrically connected with the connecting element of the circuit board. When the connecting end of the connector is electrically connected to (such as via being plugged into) the connecting element of the circuit board, the flange or structural element of the connector is attached at the rear attachment portion of the rear housing (such as via fasteners or welding or the like). When so attached, the flange or structural element of the connector engages the rear attachment portion and/or a seal disposed between the rear attachment portion and flange to seal the camera around the aperture of the rear attachment plate.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 8,694,224; 7,005,974; 5,760,962; 5,877,897; 5,796,094; 5,949,331; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 7,881,496; 7,720,580; 7,038,577; 6,882,287; 5,929,786 and/or 5,786,772, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Publication No. US-2012-0062743, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Optionally, the vision system may include a display for displaying images captured by one or more of the imaging sensors for viewing by the driver of the vehicle while the driver is normally operating the vehicle. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera assembly for a vision system of a vehicle, said camera assembly comprising:
   a front housing portion comprising a lens;
   a circuit board having a first side and a second side separated by a thickness of said circuit board, wherein an imager is disposed at said first side of said circuit board and is optically aligned with said lens, and wherein circuitry is disposed at said second side of said circuit board and electrically connected with said imager, and wherein said circuitry comprises an electrical connecting element at said second side of said circuit board;

a rear housing portion configured to join with said front housing portion, wherein said rear housing portion comprises a rear attachment portion that has an aperture therethrough, and wherein said rear housing portion comprises a mounting portion configured to attach at a vehicle;

an electrical connector, wherein said electrical connector comprises (i) a first connecting end configured for electrically connecting to a vehicular wire harness when said mounting portion is attached at the vehicle and (ii) a second connecting end for electrically connecting to said electrical connecting element of said circuit board;

wherein said second connecting end protrudes from a structural element of said electrical connector;

wherein said structural element comprises an attaching flange that engages said rear attachment portion around said aperture when said second connecting end is connected to said electrical connecting element of said circuit board;

wherein, when said front housing portion is joined with said rear housing portion, said electrical connecting element of said circuit board is aligned with said aperture of said rear attachment portion of said rear housing portion;

wherein, with said front housing portion joined with said rear housing portion, and with said electrical connecting element of said circuit board aligned with said aperture of said rear attachment portion, said second connecting end of said electrical connector protrudes through said aperture to electrically connect to said electrical connecting element of said circuit board;

wherein, with said front housing portion joined with said rear housing portion, and with said electrical connecting element of said circuit board aligned with said aperture of said attachment portion, and with said second connecting end electrically connected to said electrical connecting element of said circuit board, said structural element is attached at said rear attachment portion of said rear housing portion to attach said electrical connector to said rear housing portion and to maintain electrical connection of said second connecting end of said electrical connector with said electrical connecting element of said circuit board; and wherein said structural element is laterally adjustable relative to said rear attachment portion to align said second connecting end of said electrical connector with said electrical connecting element of said circuit board before said structural element is attached at said rear attachment portion, and wherein, when said second connecting end is aligned with said electrical connecting element and when said structural element is attached at said rear attachment portion, said structural element seals against said rear attachment portion around said aperture.

2. The camera assembly of claim 1, wherein said structural element is attached at said rear attachment portion via welding.

3. The camera assembly of claim 1, wherein said structural element is attached at said rear attachment portion via at least one fastener.

4. The camera assembly of claim 1, comprising a sealing element that circumscribes said aperture to seal against said rear attachment portion and said structural element when said structural element is attached at said rear attachment portion.

5. The camera assembly of claim 1, wherein said aperture of said rear attachment portion has a cross dimension that is larger than a cross dimension of said second connecting end of said electrical connector to allow for lateral adjustment of said second connecting end relative to said electrical connecting element during assembly of said camera assembly.

6. The camera assembly of claim 1, wherein, with said front housing portion joined with said rear housing portion, and with said electrical connecting element of said circuit board aligned with said aperture of said rear attachment portion, and with said second connecting end electrically connected to said electrical connecting element of said circuit board, said structural element is attached at an outer surface of said rear attachment portion of said rear housing portion around said aperture.

7. The camera assembly of claim 1, wherein said mounting portion of said rear housing portion is configured to attach at the vehicle via a snap attachment.

8. The camera assembly of claim 1, wherein said aperture of said rear attachment portion has a cross dimension that is larger than a cross dimension of said second connecting end of said electrical connector to allow for lateral adjustment of said second connecting end and said structural element relative to said aperture and said electrical connecting element during assembly of said camera assembly.

9. The camera assembly of claim 1, wherein adjustment and connection of said second connecting end relative to said electrical connecting element is made without a tolerance compensating flexible circuit element.

10. The camera assembly of claim 1, wherein said first connecting end of said electrical connector comprises a socket element.

11. The camera assembly of claim 1, wherein said first connecting end of said electrical connector comprises a cable having a plurality of electrically conductive wires.

12. A camera assembly for a vision system of a vehicle, said camera assembly comprising:

a front housing portion comprising a lens;

a circuit board having a first side and a second side separated by a thickness of said circuit board, wherein an imager is disposed at said first side of said circuit board and is optically aligned with said lens, and wherein circuitry is disposed at said second side of said circuit board and electrically connected with said imager, and wherein said circuitry comprises an electrical connecting element at said second side of said circuit board;

a rear housing portion configured to join with said front housing portion, wherein said rear housing portion comprises a rear attachment portion that has an aperture therethrough, and wherein said rear housing portion comprises a mounting portion configured to attach at a vehicle;

an electrical connector, wherein said electrical connector comprises (i) a first connecting end configured for electrically connecting to a vehicular wire harness when said mounting portion is attached at the vehicle and (ii) a second connecting end for electrically connecting to said electrical connecting element of said circuit board;

wherein said second connecting end protrudes from a structural element of said electrical connector;

wherein said structural element comprises an attaching flange that engages said rear attachment portion around said aperture when said second connecting end is connected to said electrical connecting element of said circuit board;
wherein, when said front housing portion is joined with said rear housing portion, said electrical connecting element of said circuit board is aligned with said aperture of said rear attachment portion of said rear housing portion;
wherein said aperture of said rear attachment portion has a cross dimension that is larger than a cross dimension of said second connecting end of said electrical connector to allow for lateral adjustment of said second connecting end and said structural element relative to said aperture and said electrical connecting element during assembly of said camera assembly;
wherein, with said front housing portion joined with said rear housing portion, and with said electrical connecting element of said circuit board aligned with said aperture of said rear attachment portion, said second connecting end of said electrical connector protrudes through said aperture and said structural element is laterally adjusted relative to said rear attachment portion to align said second connecting end of said electrical connector with said electrical connecting element of said circuit board;
wherein, with said second connecting end of said electrical connector aligned with said electrical connecting element of said circuit board, said second connecting end is electrically connected to said electrical connecting element of said circuit board;
wherein, with said second connecting end electrically connected to said electrical connecting element of said circuit board, said structural element is attached at an outer surface of said rear attachment portion of said rear housing portion to attach said electrical connector to said rear housing portion and to maintain electrical connection of said second connecting end of said electrical connector with said electrical connecting element of said circuit board; and
wherein, with said structural element attached at said rear attachment portion, said structural element seals against said rear attachment portion around said aperture.

13. The camera assembly of claim 12, wherein said structural element is attached at said rear attachment portion via welding.

14. The camera assembly of claim 12, wherein said structural element is attached at said rear attachment portion via at least one fastener.

15. The camera assembly of claim 12, comprising a sealing element that circumscribes said aperture to seal against said rear attachment portion and said structural element when said structural element is attached at said rear attachment portion.

16. The camera assembly of claim 12, wherein said first connecting end of said electrical connector comprises a socket element.

17. The camera assembly of claim 12, wherein said first connecting end of said electrical connector comprises a cable having a plurality of electrically conductive wires.

18. A camera assembly for a vision system of a vehicle, said camera assembly comprising:
a front housing portion comprising a lens;
a circuit board having a first side and a second side separated by a thickness of said circuit board, wherein an imager is disposed at said first side of said circuit board and is optically aligned with said lens, and wherein circuitry is disposed at said second side of said circuit board and electrically connected with said imager, and wherein said circuitry comprises an electrical connecting element at said second side of said circuit board;
a rear housing portion configured to join with said front housing portion, wherein said rear housing portion comprises a rear attachment portion that has an aperture therethrough, and wherein said rear housing portion comprises a mounting portion configured to attach at a vehicle;
an electrical connector, wherein said electrical connector comprises (i) a first connecting end configured for electrically connecting to a vehicular wire harness when said mounting portion is attached at the vehicle and (ii) a second connecting end for electrically connecting to said electrical connecting element of said circuit board;
wherein said second connecting end protrudes from a structural element of said electrical connector;
wherein said structural element comprises an attaching flange that engages said rear attachment portion around said aperture when said second connecting end is connected to said electrical connecting element of said circuit board;
wherein, when said front housing portion is joined with said rear housing portion, said electrical connecting element of said circuit board is aligned with said aperture of said rear attachment portion of said rear housing portion;
wherein, with said front housing portion joined with said rear housing portion, and with said electrical connecting element of said circuit board aligned with said aperture of said rear attachment portion, said second connecting end of said electrical connector protrudes through said aperture and said structural element is laterally adjusted relative to said rear attachment portion to align said second connecting end of said electrical connector with said electrical connecting element of said circuit board;
wherein, with said second connecting end of said electrical connector aligned with said electrical connecting element of said circuit board, said second connecting end is electrically connected to said electrical connecting element of said circuit board;
wherein, with said second connecting end electrically connected to said electrical connecting element of said circuit board, said structural element is attached at an outer surface of said rear attachment portion of said rear housing portion to attach said electrical connector to said rear housing portion and to maintain electrical connection of said second connecting end of said electrical connector with said electrical connecting element of said circuit board;
a sealing element that circumscribes said aperture to seal against said rear attachment portion and said structural element when said structural element is attached at said rear attachment portion;
wherein said structural element is attached at said rear attachment portion via one selected from the group consisting of (i) welding and (ii) at least one fastener; and wherein, with said structural element attached at said rear attachment portion, said structural element seals against said rear attachment portion around said aperture.

19. The camera assembly of claim 18, wherein said first connecting end of said electrical connector comprises a socket element.

20. The camera assembly of claim 18, wherein said first connecting end of said electrical connector comprises a cable having a plurality of electrically conductive wires.

* * * * *